(12) United States Patent
Anikolenko

(10) Patent No.: US 6,449,857 B1
(45) Date of Patent: Sep. 17, 2002

(54) INCLINOMETER AND INCLINOMETER NETWORK

(76) Inventor: Valery A. Anikolenko, 9 Polikarpova Street, Apartment 29, Moscow 12584 (RU)

( * ) Notice: Subject to any disclaimer, the term of this patent is extended or adjusted under 35 U.S.C. 154(b) by 0 days.

(21) Appl. No.: 09/455,930

(22) Filed: Dec. 7, 1999

(51) Int. Cl.[7] ............ G01C 9/06; G01R 27/26
(52) U.S. Cl. ............ 33/366.11; 33/366.12; 33/366.15; 33/366.19; 324/663
(58) Field of Search .......... 33/366.11, 366.12, 33/366.14, 366.15, 366.18, 366.19, 366.21, 366.22, 366.25, 366.26; 324/663, 671, 686, 690

(56) References Cited

U.S. PATENT DOCUMENTS

| | | | |
|---|---|---|---|
| 1,007,998 A | * 11/1911 | Whalton | 33/366 |
| 3,290,786 A | * 12/1966 | Parkin | 33/366 |
| 3,992,951 A | 11/1976 | Erspamer et al. | |
| 4,167,818 A | 9/1979 | Canterella et al. | |
| 4,528,760 A | 7/1985 | Plummer | |
| 4,811,491 A | 3/1989 | Phillips et al. | |
| 4,831,558 A | * 5/1989 | Shoup et al. | 364/550 |
| 4,912,662 A | * 3/1990 | Butler et al. | 33/346 |
| 5,428,902 A | * 7/1995 | Cheah | 33/366 |
| 5,612,679 A | * 3/1997 | Burgess | 33/366 |
| 5,625,955 A | * 5/1997 | Han | 33/366 |
| 5,689,445 A | * 11/1997 | Vogt et al. | 364/559 |
| 5,761,818 A | * 6/1998 | Hopkins et al. | 33/366 |
| 5,774,996 A | * 7/1998 | Ogawa et al. | 33/366 |
| 6,249,984 B1 | * 6/2001 | Barsky et al. | 33/366.15 |

FOREIGN PATENT DOCUMENTS

DE    197 25 248 A1    12/1998

\* cited by examiner

Primary Examiner—Diego Gutierrez
Assistant Examiner—Mirellys Jagan
(74) Attorney, Agent, or Firm—Breiner & Breiner, L.L.C.

(57) ABSTRACT

An electronic inclinometer and a centrally controlled network of inclinometers are disclosed. A resistive or capacitive inclinometer sensor measures inclination in two orthogonal axes. Measuring electrodes can be provided on the exterior of a dielectric sensor cell isolated from a sensor fluid. In another embodiment, measuring electrodes comprise pins partially immersed in a cell fluid contained in a metal housing and reference electrodes are provided to compensate for temperature and electrochemical changes in the sensor. Sensor signals are converted to frequency signals that are processed by a microprocessor having a unique logical address and preferably having an external solid state memory. A plurality of inclinometers can be arranged in multiple logical branches to be centrally controlled. The controller operates the network in real time or in a programmable timed autonomous mode. Network data can be presented in a graphical 3D format using software provided on the controller.

33 Claims, 5 Drawing Sheets

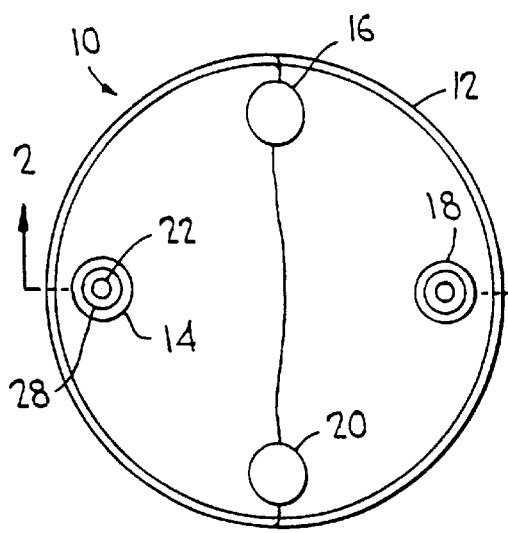
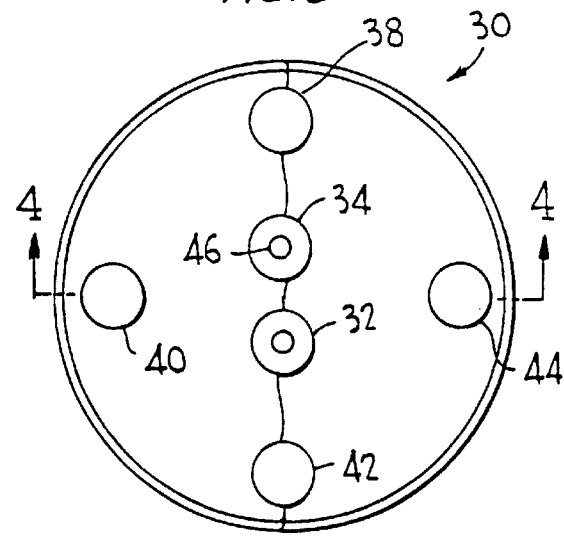
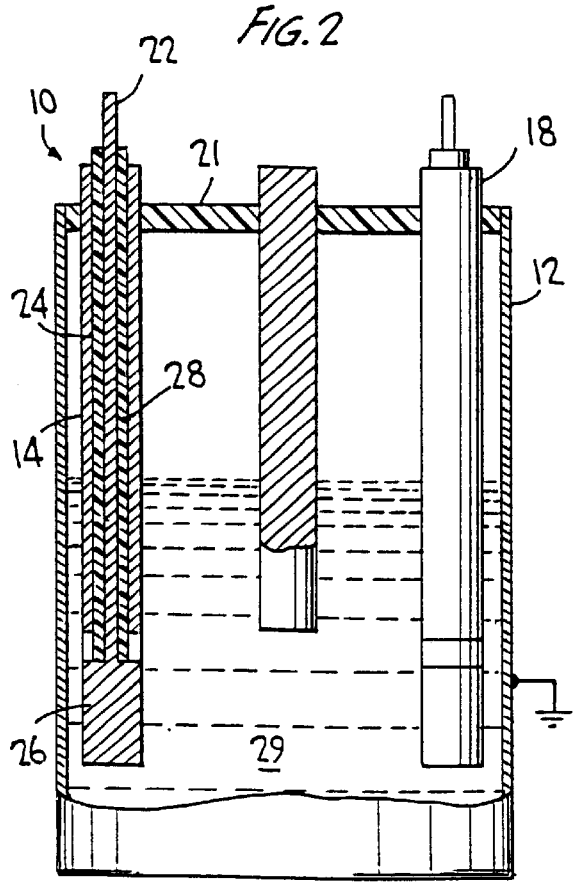
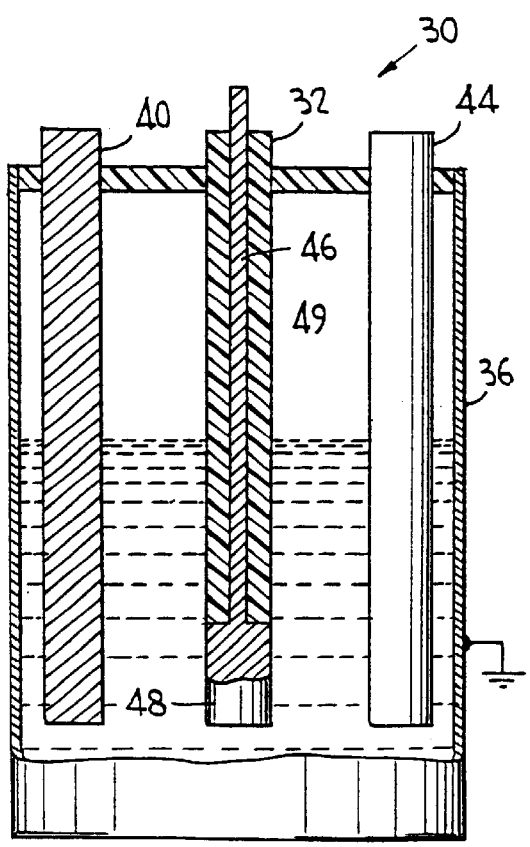

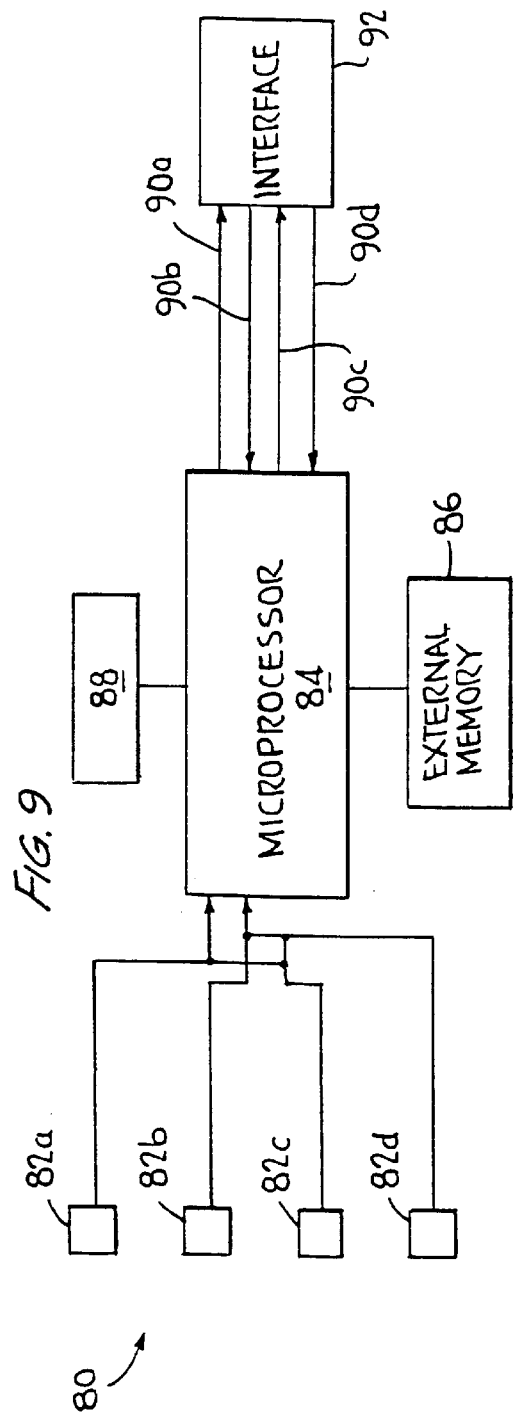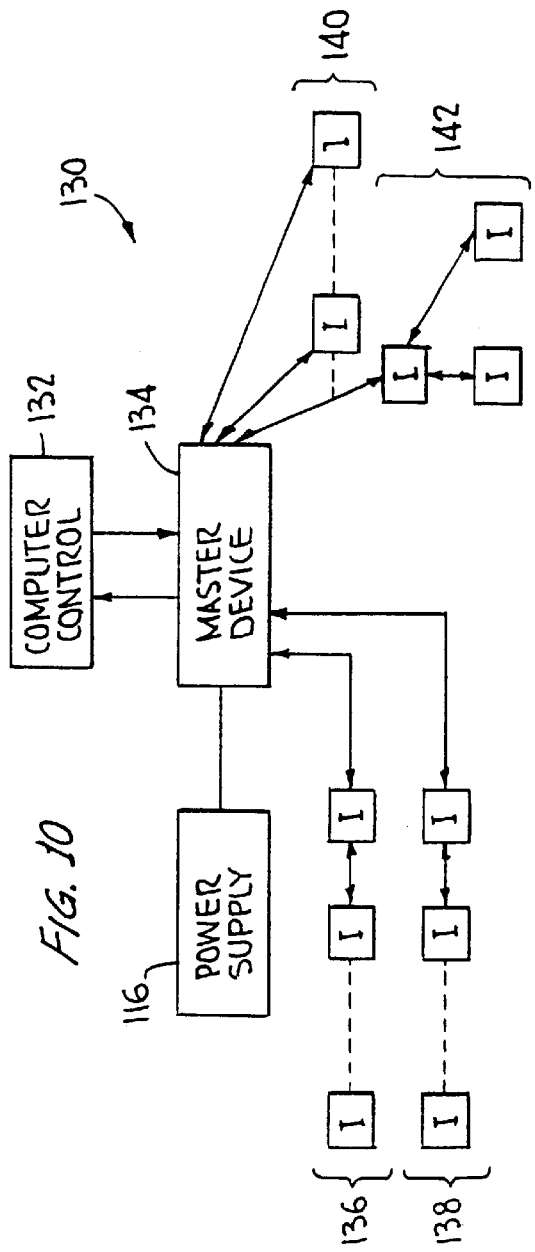

INCLINOMETER AND INCLINOMETER NETWORK

FIELD OF THE INVENTION

The present invention relates to an apparatus and method for level measurement and more particularly to a two-axis inclinometer and an integrated network of inclinometers capable of being centrally controlled and monitored.

BACKGROUND OF THE INVENTION

It is often desirable to measure the inclination of an object relative to one or more horizontal axes. A number of devices directed to this general purpose have been described.

A spirit level includes an enclosed tube that is partially filled with a liquid and has a gas bubble filling the remaining volume inside the tube. In a standard spirit level, a glass tube houses the liquid and is either slightly curved with its convex side upward or is ground with a curved inner bore. The glass tube is supported on a rigid base. Naturally, the gas bubble tends to seek the highest point in the tube containing the liquid and always comes to equilibrium at the same position whenever the base has the same slope with respect to the horizontal plane. Therefore, the user can measure inclination by observing the position of the bubble. However, there are obvious drawbacks to the spirit level, including its lack of precision as a result of its reliance on visual inspection of the bubble position.

A number of devices generally referred to as inclinometers or clinometers measure the magnitude and direction of inclination and produce an electrical signal as a function of inclination angle. Thus, an inclinometer can hold a dielectric or a conductive fluid in a chamber having two or more electrodes on or near opposite walls of the chamber, the electrodes being partially covered with fluid and with the fluid contact area on each electrode being dependent on the inclination angle of the chamber relative to gravity.

In a resistive inclinometer, the fluid has a specific conductivity and the resistance between the two electrodes varies with the contact area between the fluid and the electrodes. In a capacitive inclinometer, a dielectric fluid is used in the chamber. The electrical capacitance difference between the electrodes varies with the electrode-fluid contact area according to the inclination angle of the chamber. A common electrode can be provided such that capacitance of the common electrode is measured against that of each of the measuring electrodes.

Some prior art inclinometers have been described as having the various objectives of improving the utility, precision, accuracy, durability, efficiency or affordability of an inclinometer.

U.S. Pat. No. 4,167,818 to Cantarella et al. describes a single axis electronic inclination gauge fixed within a straight bar and having a digital output. A gravity dependent potentiometer cell operates in conjunction with a balancing bridge circuit to provide an analog voltage output whose magnitude is a function of inclination angle. This output is converted to digital values by a standard A/D converter. The cell is a sealed horizontally oriented cylindrical chamber partially filled with a semi-conductive fluid such as an alcohol. The chamber contains a central circular electrode opposing four symmetrically placed arcuate peripheral electrodes. This structure allows operation of the gauge from either of two orthogonal starting orientations. In operation, the center electrode has a function analogous to the slider of a variable resistor whereby its effective position in the resistance path between a pair of adjacent electrodes in circuit depends on the inclination angle of the chamber.

U.S. Pat. No. 4,811,491 to Phillips et al. describes an electronic capacitive inclinometer capable of measuring inclination in two axes. A non-conductive vertically oriented hollow outer cylinder has two pairs of symmetrically placed electrodes on its outside surface. An inner cylinder is spaced from the inner walls of the outer cylinder and functions as a common grounded electrode. A dielectric fluid is provided in the gap between the two cylinders. A pair of current sources charges each electrode of an opposing pair relative to the common electrode.

Analog output signals are generated as a function of the differential change in capacitance between, opposing electrodes. Their outputs are coupled to an amplifier by means of an RC low pass filter circuit. A clock-driven switch driver switches operation between the orthogonal pairs of electrodes.

U.S. Pat. No. 4,528,760 to Plummer describes a single-axis inclinometer having a common grounded electrode plate on one flat vertical outer face of a glass or plastic horizontally oriented cylinder housing and three symmetrically placed arcuate segment electrodes on an opposite outer face. A dielectric fluid partially fills the housing such that its level is always completely above one of the segment electrodes, thereby allowing inclination measurements for up to 360 degrees of inclination. Inclination is measured about a horizontal axis running through the cylinder outer surfaces. Each segment electrode is connected to a different oscillator circuit supplying a frequency to a terminal corresponding to the capacitance between the segment electrode and the common electrode. Comparison of frequency signals between terminals provides signals indicative of capacitance difference and a decode circuit is said to produce a corresponding,digital signal.

"Some inclinometers have sought-to avoid or compensate for the effects of temperature variations and electrochemical degradation. In a capacitive inclinometer, for example, temperature changes affect the dielectric constant of the sensor fluid. The cost of existing precision inclinometers, however, has been prohibitive. German Application No. DE 197 25 248 published Dec. 17, 1998 describes a two-axis capacitance inclinometer sensor provided with means for compensating for temperature changes in the environment of the sensor. The electrodes of the sensor area coated with a dielectric material such as TEFLON® polymer with the purpose of reducing screening by the sensor fluid to increase sensitivity and to improve efficiency. Temperature compensation is achieved by selecting a sensor fluid having a high dielectric constant and by including a comparison circuit wherein sensor data are adjusted based on temperature data."

U.S. Pat. No. 3,992,951 to Erspamer et al. describes an analog resistive accelerometer having a horizontally oriented cylindrical housing and including a reference electrode to compensate for changes in electrolytic fluid temperature. The reference electrode is completely immersed at all times and therefore introduces a temperature-only dependent parameter to a signal amplifier in order to cancel the effects of temperature on resistivity measurements. A different compensation circuit is provided across the amplifier to detect any net DC voltage in the electrolytic fluid as a result of the reference circuit and to supply a compensating voltage to eliminate it and prevent polarization of the fluid.

"U.S. Pat. No. 4,912,662 to Butler et al. describes a capacitive inclinometer having aligned opposing sensor plates including corresponding conducting sectors. Pairs of opposing sectors from variable capacitors. A conductive grounded peripheral edge surrounds the plates to form a fluid cavity therebetween containing a conductive fluid. The sensor plates are preferably coated with a dielectric such as TEFLON® polymer. It is said that the dielectric coating effectively reduces the distance between the capacitive plates creating a high capacitance sensor without the manufacturing difficulty of actually placing the plates in close proximity to each other. Alternatively, the fluid is a dielectric and the plate coating is eliminated. The variable capacitors are placed in an oscillator circuit that has a frequency/period output in accordance with the capacitance of the capacitors. A microchip and memory are provided with a stored look-up table which is calibrated to the individual sensor for converting the output to units of inclination angle. It is said that the interface between the sensor and the microprocessor does not require an A/D converter. A temperature normalizing circuit on the microprocessor stores reference values of capacitance for comparison to measured values."

U.S. Pat. No. 5,428,902 to Cheah describes a two-axis resistive inclinometer provided with a Schmitt trigger circuit for producing a frequency measurement of inclination angle to be sent to a microprocessor. Counter circuitry is used to determine the frequency. A sensor includes a vertically oriented cylindrical vessel containing an electrolytic fluid and five electrode pins immersed in the fluid to allow resistance measurements between any two electrodes across the Schmitt trigger. The sensor is thus made the variable resistance element in the Schmitt circuit. Electrode polarity is periodically reversed to minimize net DC current flow through the electrodes which can change the resistivity of the electrolytic fluid. The Schmitt trigger circuit is cycled between the electrodes to provide the necessary tilt measurements.

These and other devices have not achieved a satisfactory combination of the often aspirational objectives of an inclinometer. It would be desirable to have an electronic inclinometer combining, among other things, two-axis measurement, precision, reliability, simplicity, low power consumption and low cost.

It has further been proposed to arrange a plurality of inclinometers in a centrally monitored network. Such a network is desirable in several applications where inclinometer data is taken. For example, structures such as buildings, runways, machinery, mining facilities, pipelines and the like may require comprehensive monitoring at numerous locations of forces impacting the structure for purposes of safety and/or maintenance. Central monitoring adds convenience and safety to the process of data collection.

U.S. Pat. No. 4,831,558 to Shoup et al. describes a linear network of transducer units linked in a linear array to a central controller, each unit having a microprocessor and buffer circuitry. The transducers include a detector of a physical parameter. A microchip associated with each unit provides a programmable address and the capability of filtering and converting a transducer signal into a digital format, temporarily storing the digital data and transmitting it to the controller. The buffer circuit, controlled by the microprocessor, directs incoming and outgoing data between the controller and the transducer. Transducer data is carried by a system bus through an interface to the central controller. The controller is capable of polling data from individual units in real time or on a timed schedule. Each transducer microchip is capable of receiving a uniquely addressed polling signal from the central controller. The transducer units can be either centrally powered, preferably by a 5 volt line, or alternatively can be individually powered.

Unfortunately, the network of the '558 patent has several drawbacks making it less than ideal for practical industrial applications. For example, the power supply cannot accommodate the long branched chains of inclinometer units desirable for large scale applications. Further, a constant power supply is required to maintain the individual memories of the units. Large amounts of power are also consumed by its conventional A/D converter. The network is further limited in terms of versatility due to its inability to operate in an autonomous mode wherein power is automatically switched on periodically and measurements are taken and stored in each unit. The addressing capability of the units further does not include a built-in permanent logical address which can be integrated with an individual calibration file.

German Application No. DE 197 25 248 (also referred to above) discloses a centrally monitored inclinometer network. A capacitive inclinometer includes a sensor and a built-in microprocessor having an integrated memory. The microprocessor controls the sensor according to a preset time program. Capacitance is measured by a frequency generator followed by A/D conversion and storage of digital data in memory. A built-in interface provides for transmission of data to a central controller. The sensors are provided as a network in a parallel or serial array. Measurement can be conducted on demand by an operator or periodically by program. Data polling from the sensors can be conducted in real time or from inclinometer memory. Unfortunately, this network does not meet current needs. The microprocessors require continuous power to record and store only limited amounts of data and a power shut-down causes a complete loss of data. Overall power consumption is high because of continuous consumption and the A/D conversion device employed. Further, the network is limited by its capacity for data storage and transmission.

Therefore, it is inflexible and cannot easily accommodate additional transducers for measuring physical phenomena other than inclination.

Among other drawbacks, previously existing systems lack adequate data processing and presentation means. It would therefore be desirable to have a rugged, durable, efficient and inexpensive network of centrally controlled precision two-axis inclinometers without the shortcomings of previously existing devices.

OBJECTS AND SUMMARY OF THE INVENTION

Accordingly, it is a primary object of the present invention to provide an improved network of centrally monitored electronic inclinometers meeting the criteria set forth above and others.

It is another object of the invention to provide a resistive or capacitive inclinometer cell combining low cost and precision.

It is another object of the invention to provide an inclinometer having reduced power consumption.

It is another object of the present invention to provide an inclinometer having an improved temperature compensation feature.

It is another object of the present invention to provide an inclinometer having improved drift correction.

It is another object of the invention to provide an electronic inclinometer having simple and inexpensive circuitry and construction.

It is another object of the invention to provide an electronic inclinometer that produces a frequency signal as a measure of inclination angle, avoiding the need for conventional A/D conversion during signal processing.

It is another object of the invention to provide an electronic inclinometer having a solid state memory and a built-in permanent logical address.

It is another object of the present invention to provide an inclinometer having a power saving autonomous or sleep mode and a memory capable of storing data without a constant power supply.

It is further an object of the present invention to provide a centrally controlled inclinometer network including logical branches of inclinometer units.

It is another object of the invention to provide improved data storage and processing means for an inclinometer and network including software for a central controlling means.

It is another object of the present invention to provide an inclinometer network including a master device to centrally control the power supply to a network in a programmable autonomous operation mode.

Briefly, these objects and others are attained by an inclinometer and a centrally controlled and monitored network of said inclinometers. The inclinometer embodiments described in detail herein have capacitive sensors, however it is to be understood that the sensor cell of the invention can be either resistive or capacitive.

In one aspect of the invention, an inclinometer sensor cell is provided for measuring inclination in two orthogonal axes.

In one embodiment, a sensor includes a metal housing which can be a vertically oriented cylinder and a plurality of measuring electrode pins partially immersed in a dielectric fluid contained within the cell. Preferably, four electrodes are symmetrically placed inside the housing near its perimeter. The sensor preferably further includes reference electrodes to provide signals compensating for the effects of temperature and electrochemical changes in the sensor cell. The reference electrodes are immersed in the fluid near the center of the housing making their outputs independent of inclination. The reference electrodes can be coaxial with an outer electrode having a plurality of apertures. One benefit of the reference electrodes is that the measuring electrodes need not comprise costly precious metals and need not be coated with a dielectric material. Additionally, the fluid provided in the cell need not have a particularly high dielectric constant. In this manner precision and accuracy are achieved at a low cost.

In another embodiment of the invention, a sensor cell comprises a reservoir defined by an insulating glass or plastic housing containing a dielectric fluid. Electrodes are provided as opposing vertical metal strips applied to opposite sides of the housing exterior, isolated from the fluid. Alternatively, the housing can be provided with symmetrically arranged dielectric pipes containing the fluid and having the electrodes disposed thereon. Linearity of response can be enhanced by employing a housing having spherical outer surfaces.

Each inclinometer in the network of the invention further includes an electronic block. The electronic block includes a microprocessor capable of receiving and managing signals from the sensor cell and from a central computer. In a preferred embodiment, each sensor electrode is linked to an RC frequency generator. When measurements are taken, the RC generator measures the capacitance between the electrode and a common electrode or ground and emits a frequency as a function thereof. The microprocessor receives the frequency signals of all of the RC generators and, acting as a counter, counts the differences between the frequencies corresponding to opposing electrodes. One major advantage of this configuration is significantly reduced power consumption due to the absence of a conventional A/D converter. The microprocessor further includes a unique built-in permanent logical address. This permits the construction of a network of several programmable logical inclinometer branches, as discussed in greater detail hereinafter. A standard serial interface is provided for connection of the inclinometer to the network.

The inclinometer of the invention can include a temperature drift compensation circuit or a built-in temperature gauge providing data for a temperature compensation function. A calibration file specific to each particular sensor can also be provided.

The inclinometer of the invention is provided with memory means, preferably a solid state memory externally linked to the microprocessor as part of the electronic block. A constant power supply is therefore not required to maintain data stored in the external memory.

In another aspect of the invention, a central controlling means such as a computer is linked to and capable of remotely programming and operating an inclinometer network via standard serial interfaces. The controlling means allows operation of a network via any known communication means such as telephone, internet, or hard wire. The network can be operated and monitored in real time and additionally is programmable to periodically poll data in an autonomous mode. The autonomous mode includes a sleep phase in which power to the network is completely shut down. In this connection, a central master device is preferably provided for periodically switching on power to the network only at specified times of measurement taking.

The controlling means can be equipped with specialized data manipulation software for displaying network data in useful and convenient forms. For example, network data can be comprehensively displayed by a computer in a 3D format which visually represents conditions in a structure such as a building, runway or the like.

The invention will be more fully understood with reference to the drawings and the following description of the presently preferred embodiments.

BRIEF DESCRIPTION OF THE DRAWINGS

For a better understanding of the invention as well as other objects and features thereof, reference is made to the following detailed description of the presently preferred embodiments in connection with the accompanying drawings, wherein:

FIG. 1 is a top plan view of an inclinometer sensor according to the present invention;

FIG. 2 is the sensor of FIG. 1 viewed along line 2—2;

FIG. 3 is a top plan view of a second embodiment of an inclinometer sensor according to the invention;

FIG. 4 is the sensor of FIG. 3 viewed along line 4—4;

FIG. 9 is a schematic diagram of the electronic components of an inclinometer according to the invention FIG. 10 is a schematic diagram of an inclinometer network according to the invention.

DETAILED DESCRIPTION AND PRESENTLY PREFERRED EMBODIMENTS

Figure 5:
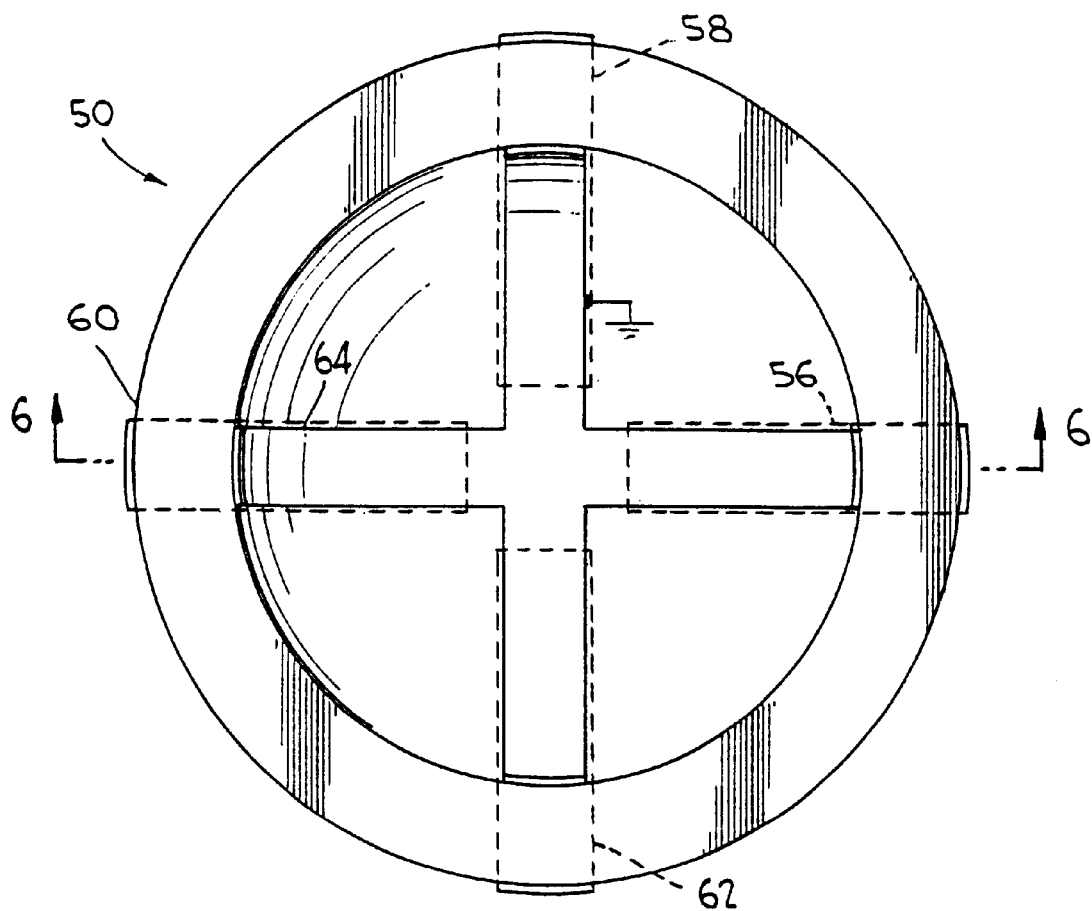
FIG. 5 is a top plan view of a third embodiment of an inclinometer sensor according to the invention.

In the drawings, there are shown the preferred embodiments of the present invention, including the sensor cell, electronic circuitry and inclinometer network.

"Referring to FIGS. 1 and 2, capacitive two-axis sensor cell 10 includes housing 12 and measuring electrode pins 14, 16, 18 and 20 which are positioned less than half the distance from the center of housing 12 to the interior wall of housing 12. Cylindrical housing 12 comprises a conductive material such as stainless steel and functions as a common electrode. Each electrode pin is suspended from insulating housing cover 21. The electrode pins are positioned as two pairs in two plates such that each pair's relative position is sensitive to tilt in a different orthogonal axis. Electrodes 14, 16, 18 and 20 preferably comprise an inexpensive metal such as a nickel alloy. Electrode 14, shown in cut-away is associated with coaxial reference electrode 22 including lead 24 extending through a hollow core of electrode 14 to terminal lobe 26 which is made of the same material as electrode 14. An insulator 28 coats lead 24 maintaining lead 24 in isolation from electrode 14 and a surrounding dielectric fluid 29, discussed hereinafter. Lobe 26, however, is fully exposed to the fluid at all times independent of the inclination angle of the cell during operation. Preferably, at least two reference electrodes in the manner of electrode 22 are provided to form a reference pair. Electrodes 14, 16, 18 and 20 (and the reference electrodes) extend above housing 12 to contacts for connection to an electronic block, discussed hereinafter."

Sensor cell 10 is partially filled with dielectric fluid 29 to set up a variable capacitor between each electrode and housing 12 and having a capacitance which is dependent on the fluid level covering the electrode. Suitable dielectric fluids include glycerol, acetone, ethylene glycol and silicones. As previously noted, the reference electrodes provide a comparison signal that compensates for temperature and electrochemical changes in the cell. Thus, the need for a high dielectric fluid in the cell or dielectric electrode coatings is eliminated. A fluid having a dielectric constant of above about two is sufficient. Additionally, the electrodes need not comprise an expensive precious metal.

Referring to FIGS. 3 and 4, sensor cell 30 is another embodiment of the two-axis sensor of the invention, wherein reference electrodes 32 and 34 are positioned in housing 36 independently of measuring electrodes 38, 40, 42 and 44. Reference electrode 32 includes lead 46 and terminal lobe 48. Insulator 49 isolates lead 46 from the dielectric fluid in housing 36. As with the embodiment of cell 10, lobe 48 is made from the same material as the measuring electrodes and remains immersed at all times. In a similar preferred embodiment (not shown in the drawing), reference electrodes comprise a coaxial pair spaced from each other wherein the outer electrode has apertures to allow dielectric fluid to enter the internal space between the electrodes. The embodiment provides advantages in terms of structural simplicity and economics.

Figure 6:
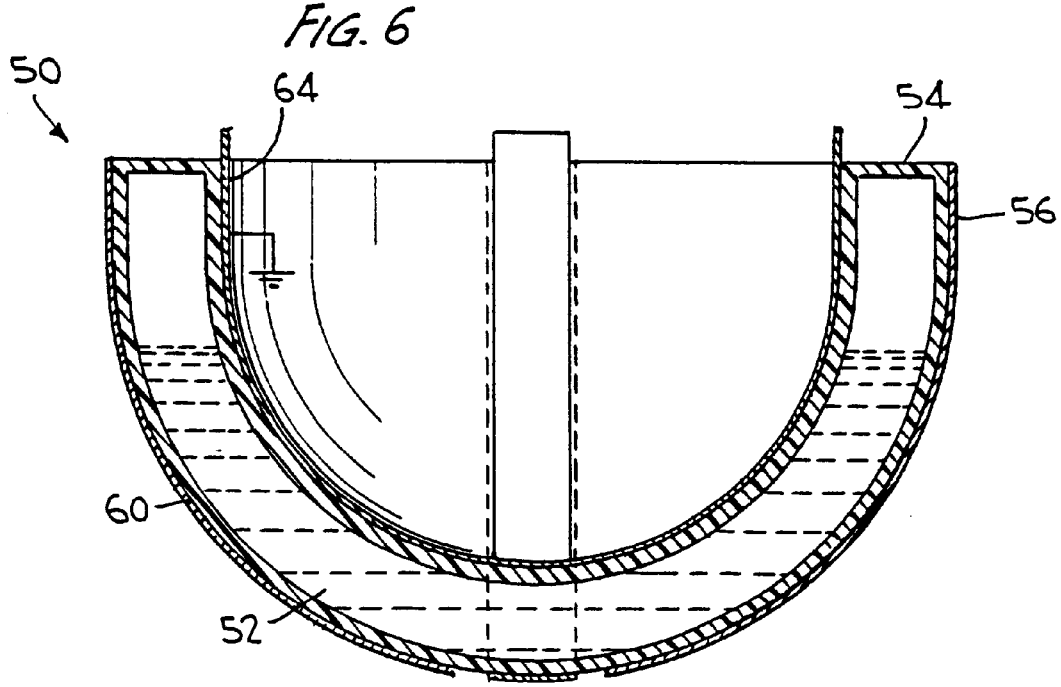
FIG. 6 is the sensor of FIG. 5 viewed along line 6—6.

Referring now to FIGS. 5 and 6, sensor cell 50 is another embodiment of the two-axis sensor of the invention. Cell 50 comprises a dielectric housing 54 defining a chamber partially filled with dielectric fluid 52 and having four electrode strips 56, 58, 60 and 62 disposed in orthogonal pairs on the exterior sides of the housing. Housing 54 is made from a rigid insulating material such as glass, ceramic or plastic, the preferred materials being glass or plastic. Although not limiting to the invention, a hemispherical structure including a concave exterior profile is provided to minimize signal distortions through the full range of inclination angles. Linearity of response can be enhanced by other means, as described further hereinafter.

Measuring electrodes 56, 58, 60 and 62 comprise metal strips which in manufacture have preferably been sprayed onto the exterior of housing 54. Useful metals for the electrode strips include copper, silver or any other metal alloy commonly used in electrodes, the preferred metal being copper or copper alloys. As shown in the drawing, the electrodes are arranged in opposing pairs disposed in orthogonal planes. A common grounded electrode 64 is provided on an upper exterior surface of housing 54 opposite the measuring electrodes to set up variable capacitors across the dielectric fluid, similar in principle to those described in connection with sensors 10 and 30. In contrast to the sensors 10 and 30, however, the electrodes 56, 58, 60 and 62 of cell 50 are inherently isolated from the dielectric fluid and are therefore not susceptible to electrochemical degradation thereby. Another consequence of this structure is that the cell capacitances are reduced in accordance with the dielectric constant of housing 54.

Figure 7:
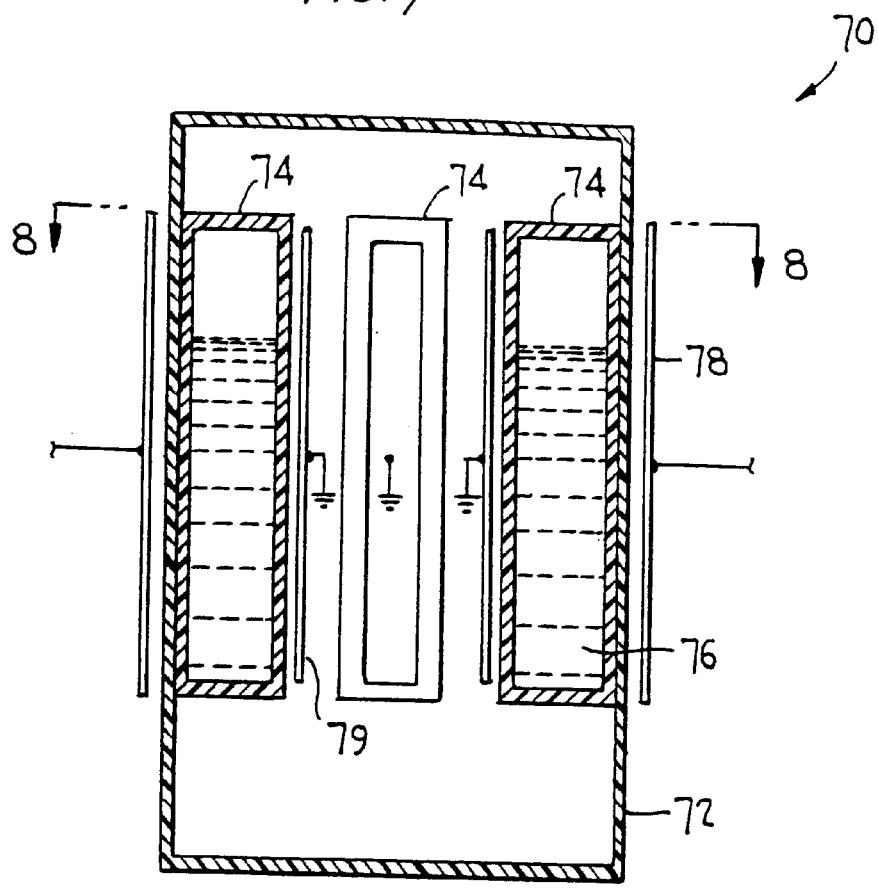
FIG. 7 is a top plan view of a fourth embodiment of an inclinometer sensor according to the invention.
Figure 8:
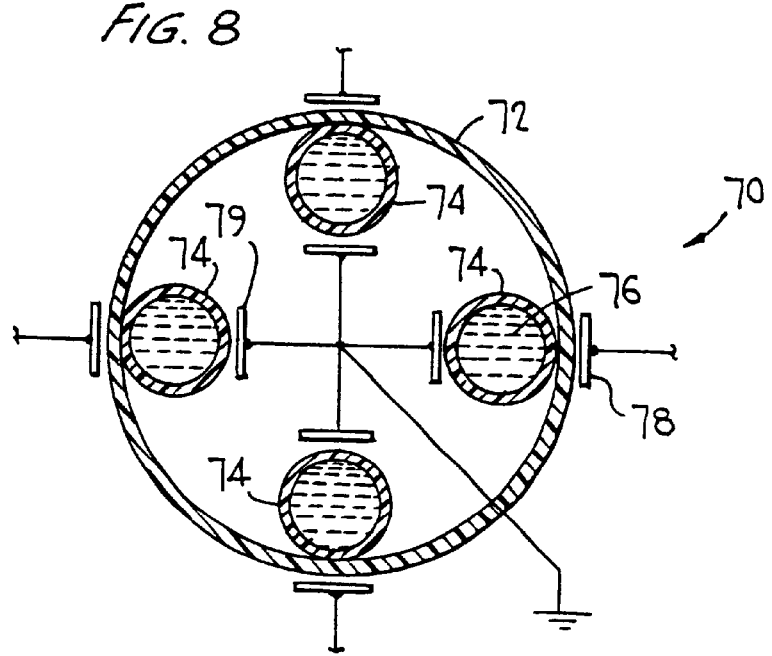
FIG. 8 is the sensor of FIG. 7 viewed along line 8—8.

Sensor cell 70, shown in FIGS. 7 and 8, is a further embodiment of the two-axis inclinometer cell of the present invention, similar in principle and materials to the embodiment of FIGS. 5 and 6. Sensor 70 comprises dielectric housing 72 containing four identical hollow dielectric tubes 74 evenly spaced apart and attached at the housing perimeter. The tubes 74 are partially filled with dielectric fluid 76. Each tube 74 has a measuring electrode 78 applied to its exterior and an opposing ground electrode 79 on an opposite side. In this embodiment, fluid is present only in the tubes, which comprise the critical regions between electrode pairs. Electrodes 78 and 79 are inherently isolated from the dielectric fluid and are therefore protected from electrochemical degradation.

Figure 11:
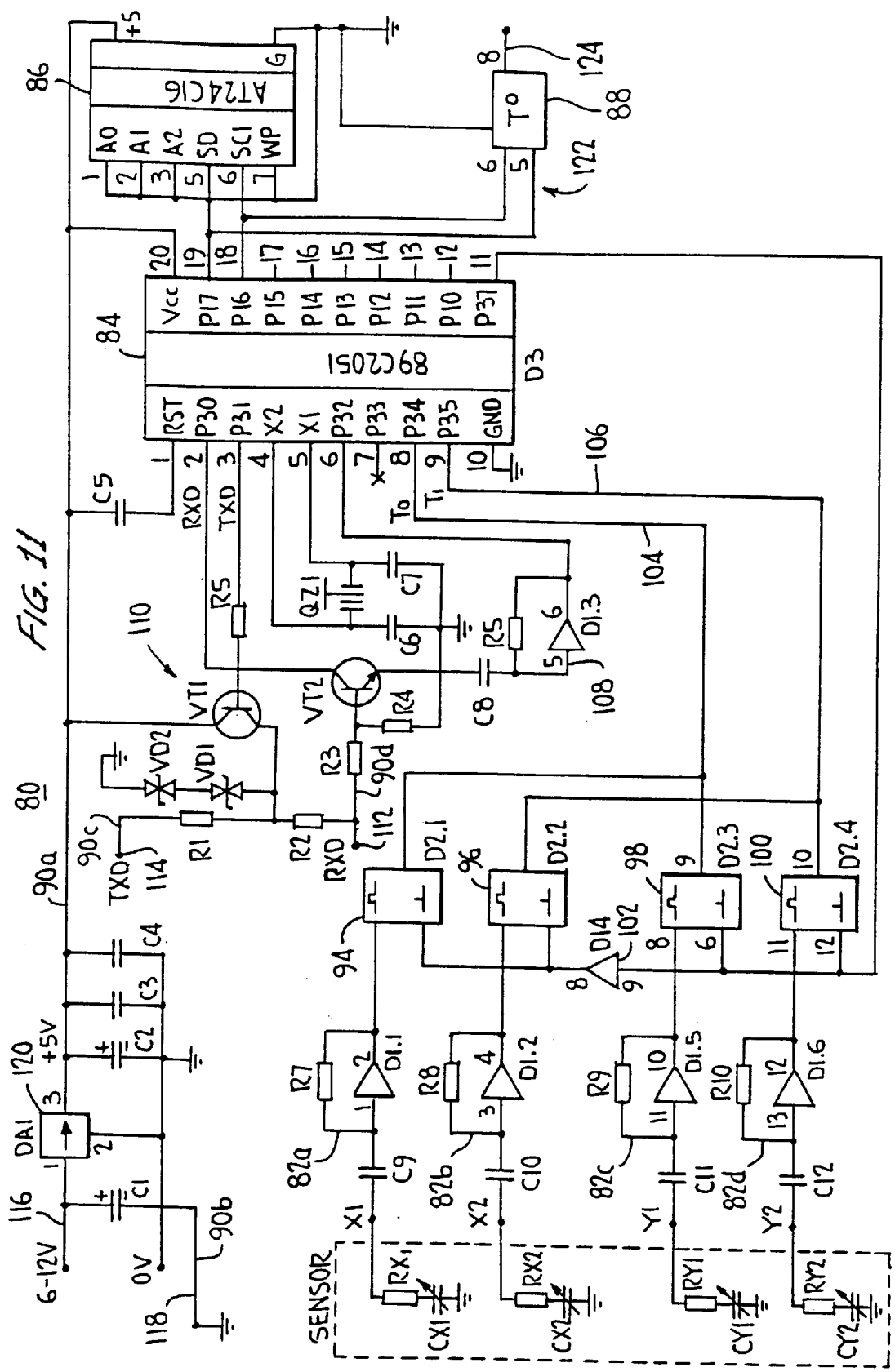
FIG. 11 is a schematic circuit diagram of a circuit including a sensor and electronic block according to the invention.

Referring to FIGS. 9 and 11, an inclinometer according to the present invention is provided with a programmable electronic block 80 including four RC frequency generators 82a–82d associated with the respective sensor cell electrodes, microprocessor 84, solid state external memory 86, temperature gauge 88, power/data lines 90a–90d and serial interface 92 for connection to a controller or a network. A more detailed schematic view of electronic block 80 is shown in FIG. 11.

The RC generators are built with digital CMOS microcircuits in an integrated Schmitt trigger including signal inversion. In this manner, capacitance signals from the individual sensor cell components are converted to frequencies that are transmitted to single chip microprocessor 84. Thus, by way of example RC generators 82a and 82b can be associated to opposing electrodes such as 56 and 60 of FIGS. 5 and 6 measuring capacitance values in a first axis.

"A communication unit comprising commutators 94, 96, 98 and 100 and inverter 102 provide periodic switching of the RC outputs transmitted to counting input channels 104 and 106 of microprocessor 84. After, a predetermined counting period, the frequency source for inputs 104 and 106 are switched from one pair of RC generators (either 82a and 82b or 82c and 82d) to the other. The commutator can be of the type CD4066 or the like. Microprocessor 84 in the embodiment shown is an AT89C2051 ATMEL chip and includes a measurement algorithm for generating digital values according to the data arriving at inputs 104 and 106. This structure avoids the need for conventional A/D conversion. After several measurements, preferably at least three measurements, are taken and stored within a predetermined time period, an average is calculated and stored in the internal memory of microprocessor 84.

Signals from the optional reference electrodes and associated RC generator (not shown in FIGS. 9 and 11) are similarly processed by microprocessor 84. Specifically, microprocessor 84 subtracts reference frequency signals from measurement frequencies before comparing data from opposing measuring electrodes.

In FIG. 11, an additional or alternative reference function is provided electronically. A drift compensation circuit. 108, shown in FIG. 11, can be provided as part of electronic block 80 to compensate for effects from temperature changes on the signal from the particular sensor cell. Further, together with or separate from drift compensation unit 108, temperature gauge 88 can be used to provide a reference signal which can be applied in a reference function to adjust inclination data based on known temperature effects on the dielectric fluid. These reference functions are simpler and less costly than installation of reference electrodes and corresponding circuitry.

In another aspect of the invention, microprocessor 84 can store a calibration file specific to the particular sensor cell with which it is associated. The calibration file is used to modify digital measurement data in a reference function according to the particular structural features of the associated sensor. Calibration files can also be stored centrally at the central computer as paging files activated according to the unique address of its associated sensor."

Temperature can also be monitored at the location of the inclinometer by gauge 88 and stored in memory. Completed data sets (preferably including inclination averages in two axes and temperature data) are transferred to external memory 86. Memory 86 in the embodiment shown is a solid state memory or EEPROM such as a 24C16 chip having a C12 interface. As previously mentioned, external memory 86 sustains stored data without a constant power supply. This feature is important to autonomous operation of a network, an additional aspect of the invention described further hereinafter in connection with the network and central control aspects of the invention. Microprocessor 84 or external memory 86 has a built-in permanent memory containing a unique logical address, also described hereinafter.

The presently preferred embodiment employs a standard telephone cable having four lines 90a–d for transmitting power and data between microprocessor 84 and serial interface 92. Thus, lines 90a and 90b are data input and output transmission lines, respectively.

Lines 90c and 90d correspond to a variable power supply lines and ground, respectively. Interface 92 can be a standard RS-232 interface for connecting electronic block 80 to a suitable controller such as the network controller of FIG. 10. Electrical matching circuitry, generally designated 110, is provided for matching the logic signals from microprocessor 84 to the signals of interface 92. Data are received at input 112 and transmitted at output 114.

A nonstable variable power supply of 6V–15V is designated 116 in FIG. 11. Signal ground 118 is also provided. Power supply 120 provides a stabilized 5V power supply to block 80. An advantage of having a variable power supply such as 116 is that longer network branches can be successfully operated. A fixed voltage power supply would not be ideal for this reason. Power can be supplied over a standard telephone cable, as previously mentioned. Alternatively, or in addition to power supply 116, each inclinometer can be provided with a local battery power supply.

Often, temperature monitoring is desired in connection with inclinometer applications. Temperature gauge 88 (e.g. from the Dallas Semiconductor temperature sensor family) is an optional feature providing a separate ambient temperature monitoring function at the location of an inclinometer. As shown in FIG. 11, gauge 88 has output channels 122 connected to external memory means 86. A separate 5V power supply 124 is also provided. Gauge 88 can be also be used in a temperature compensation function.

Data from gauge 88 can be used to adjust inclination data according to known effects of temperature on dielectric fluids.

The inclinometer provided by the invention can be operated as a single unit or in a network array. Thus, in another aspect of the invention, a remotely controlled inclinometer network is provided. Network 130 (FIG. 10) is illustrative of a preferred network according to the present invention. Network 130 includes a central control computer 132, power supply 116, master device 134, and logical inclinometer branches 136, 138, 140 and 142. As seen in the drawing, the branches can be arranged as desired without regard to their actual physical interconnections. The system of the invention including logical branches of inclinometers optimizes data storage and transmission capacities of the network to provide a robust system capable of handling not only large numbers of inclinometers but also supporting devices such as temperature gauges and pressure gauges. Computer 132 can be any suitable computer having a CPU such as a PC running Microsoft WINDOWS® linked to master device 134 by any suitable means such as by telephone line, internet, hardwire or radio connection. Computer 132 is provided with software enabling a user to program and control each inclinometer according to its logical address and each inclinometer logical branch as a group. Specifically, when using the presently preferred circuitry, logical branches of up to thirty-two inclinometers each can be formed and collectively programmed and polled in real time or in an autonomous mode, described hereinafter.

Individual inclinometers are addressable in the same manner. The configuration described in this preferred embodiment has the advantage, among other things, of accelerating the bi-directional transfer of data as compared to prior art serial networks.

An autonomous network operation mode is preferably provided to facilitate automatic measurement taking by selected inclinometers or branches at predetermined time intervals. Based on their logical addresses, computer 132 is capable of programming particular inclinometers to take measurements as desired. The data are stored in the external memory 86 of each inclinometer until polled by computer 132. In a power saving aspect of the invention, network power is shut down in the autonomous mode and master device 134 operates to activate power supply 116 only during periodic times of measurement taking. Solid state memory 86, by preserving measurement data during extended dormant periods, is important to autonomous network operation. Memory 86 is capable of storing a large number of records during autonomous operation. As previously mentioned, the absence of a conventional A/D converter in the inclinometers' electronic blocks provides additional power savings. The network can operate for periods of over a year in the autonomous mode.

The network of the present invention is. sufficiently versatile to accommodate transducers other than inclinometers in an analogous system which can include transducers for measuring more than one type of physical phenomenon.

In another aspect of the invention, the central computer 132 is provided with data processing and presentation software for three-dimensional (3D) graphic data mapping. Known and commercially available software, such as the SURFER® program, available from Golden Software, Inc. of Golden, Colorado, can be operated on computer 132 to utilize network measurement data already present in the computer in its mapping function. This feature, in combination with other aspects of the invention, provides a useful representation of integrated data from the inclinometers of the network. As an illustrative example, in monitoring surface of underground structural facilities or in studying soil/foundation/structure interactions, 3D mapping of inclines, displacements, deformations and strains can be highly valuable.

The network of the present invention is especially suitable for but not limited to monitoring mining and rock engineering facilities, surface stability in the vicinity of oil wells, runways, tunnels and bridges, gravity dams and slopes of water reservoirs, surface subsiding and sedimentation and structural engineering. In these and other applications, the advantages of the inclinometer and network of the invention include the ability to monitor physical data for an entire facility or structure from one safe and remote location. Time and effort,are thereby conserved. Moreover, the network and individual inclinometer units are relatively inexpensive and thereby provide an economical option where previously there was none.

As will be apparent to those skilled in the art, various modifications can be made within the scope of the aforesaid description. Some of these have been specifically described but are by no means comprehensive. Such modifications being within the ability of one skilled in the art form a part of the present invention and are embraced by the appended claims.

It is claimed:

1. A two-axis inclinometer comprising:
    a sensor cell including a conductive housing defining a fluid chamber partially filled with a fluid;
    at least four measuring electrodes vertically suspended in said chamber and partially immersed in said fluid;
    said measuring electrodes being evenly spaced apart near an interior wall of the housing to form two pairs, said pairs lying in orthogonal vertical planes;
    and two reference electrodes vertically suspended in said fluid;
    said reference electrodes having a level of exposure to said fluid which is independent of the orientation of said housing relative to gravity during operation; and
    said sensor cell forms part of a circuit including a microprocessor for transmitting, processing and storing signal data from said sensor cell.

2. The inclinometer of claim 1, wherein each of said two reference electrodes is coated with an insulating material extending from an upper section of each of said reference electrodes and leaving a lower section of each of said two reference electrodes uncovered.

3. The inclinometer of claim 2, wherein said reference electrodes are positioned less than half the distance from the center of said housing to said interior wall.

4. The inclinometer of claim 1, 2 or 3, wherein said measuring electrodes and said reference electrodes are made from a material selected from the group consisting of nickel, nickel alloys, copper and copper alloys.

5. The inclinometer of claim 1, 2 or 3, wherein said circuit further comprises:
    a solid state memory capable of storing data without a continuous power supply;
    a built-in unique address located in said microprocessor or in said solid state memory;
    means for converting signals from said measuring electrodes and said reference electrodes to frequency signals;
    a nonstable variable power supply for supplying said inclinometer with 6–15 Volts;
    a commutation unit for periodically switching a source of measurement signals moving to said microprocessor;
    said microprocessor includes means for creating and storing digital values representative of inclination angles in two axes based on said frequency signals;
    means for transferring said digital values to said solid state memory; and
    said inclinometer is remotely controlled by a central controller to make measurements, store said digital values and transmit said values to said central controller.

6. A method of utilizing the inclinometer of claim 1, 2 for 3 comprising steps of:
    placing said inclinometer in a desired location;
    supplying power to said circuit;
    converting signals from said sensor cell to frequency values;
    transmitting said frequency values from a first of said two pairs of electrodes to said microprocessor;
    counting and comparing said transmitted frequencies to arrive at a digital value corresponding to inclination in a first axis;
    transmitting said frequency values from a second of said two pairs of electrodes to said microprocessor;
    counting and comparing said transmitted frequencies to arrive at a digital value corresponding to inclination in a second axis;
    transmitting said digital values to a solid state external memory; and
    polling said digital values in said solid state memory from a central controller by identifying said inclinometer according to a unique logical address stored in said solid state memory or in said microprocessor.

7. The method of claim 6, further comprising repeating each said counting and comparing step at least three times and generating an average value corresponding to inclination in each of said first and second axes.

8. The method of claim 6, wherein said power is supplied by a non-stabilized power supply of 6–15 Volts.

9. The method of claim 6, wherein said circuit further comprises a temperature gauge and measuring the temperature using said gauge during each of said transmitting of said frequency values, transmitting temperature data to said microprocessor, and using a calibration file in said microprocessor to modify said inclination values according to said temperature.

10. The method of claim 6, further comprising using drift circuit means in said circuit to compensate for effects from temperature changes on said signals from said sensor cell.

11. The method of claim 6, further comprising using an individual calibration file located in said central controller or in said microprocessor to adjust said digital values according to structural features specific to said sensor cell.

12. The method of claim 6, further comprising using said central controller to turn on said inclinometer and to request measurements in real time.

13. The method of claim 6, further comprising programming said microprocessor to take measurements at predetermined intervals and store resulting said digital values in said solid state memory.

14. An inclinometer network including at least two inclinometers according to claim 1, 2 or 3,
wherein each Of said two inclinometers has a serial interface linking each of said two inclinometers to said network;
a central controller for programming, polling and receiving data from said inclinometers according to a unique address associated with each of said two inclinometers;
means for connecting said inclinometers together in logical chains;
a power source and a master device in communication with each of said central controller and said power source; and
said master device being capable of turning power to said inclinometers on and off according to commands from said central controller.

15. The network of claim 14, further comprising autonomous mode means for operating said network, wherein said master device periodically activates said network according to a preset program and said inclinometers take measurements and store data; said inclinometers transmitting compiled data upon request from said central controller.

16. The network of claim 14, wherein said power source comprises a non-stabilized 6–15 Volt source.

17. The network of claim 14, wherein said central controller includes software means for processing and presenting said data in a graphical format.

18. A two-axis inclinometer comprising:
a sensor cell including a conductive housing defining a fluid chamber partially filled with a fluid;
at least four measuring electrodes vertically suspended in said chamber and partially immersed in said fluid;
said measuring electrodes being evenly spaced apart near an interior wall of the housing to form two pairs, said pairs lying in orthogonal vertical planes;
and two reference electrodes vertically suspended in said fluid;
said reference electrodes having a level of exposure to said fluid which is independent of the orientation of said housing relative to gravity during operation; and
said sensor cell forms part of a circuit including a microprocessor for transmitting, processing and storing signal data from said sensor cell;
wherein each of said two reference electrodes is coated with an insulating material extending from an upper section of each of said reference electrodes and leaving a lower section of each of said two reference electrodes uncovered; and
wherein each of said two reference electrodes is coaxial to one of said measuring electrodes such that said each of said two reference electrodes has a lead extending through a hollow core in one of said measuring electrodes and insulated from said fluid and said measuring electrodes;
said each of said two reference electrodes has a reference extension extending below said lead and said measuring electrodes; and
each of said two reference electrodes is insulated from said measuring electrodes and exposed to said fluid.

19. A two-axis inclinometer comprising:
a sensor cell including a conductive housing defining a fluid chamber partially filled with a fluid;
at least four measuring electrodes vertically suspended in said chamber and partially immersed in said fluid;
said measuring electrodes being evenly spaced apart near an interior wall of the housing to form two pairs, said pairs lying in orthogonal vertical planes;
and two reference electrodes vertically suspended in said fluid;
said reference electrodes having a level of exposure to said fluid which is independent of the orientation of said housing relative to gravity during operation; and
said sensor cell forms part of a circuit including a microprocessor for transmitting, processing and storing signal data from said sensor cell;
wherein said reference electrodes are positioned less than half the distance from the center of said housing to said interior wall; and
wherein said reference electrodes comprise a coaxial pair with an inner electrode and an outer electrode spaced from said inner electrode, said outer electrode having a plurality of apertures.

20. The inclinometer of claim 18 or 19, wherein said measuring electrodes and said reference electrodes are made from a material selected from the group consisting of nickel, nickel alloys, copper and copper alloys.

21. The inclinometer of claim 18 or 19, wherein said circuit further comprises:
a solid state memory capable of storing data without a continuous power supply;
a built-in unique address located in said microprocessor or in said solid state memory;
means for converting signals from said measuring electrodes and said reference electrodes to frequency signals;
a nonstable variable power supply for supplying said inclinometer with 6–15 Volts;
a commutation unit for periodically switching a source of measurement signals moving to said microprocessor;
said microprocessor includes means for creating and storing digital values representative of inclination angles in two axes based on said frequency signals;
means for transferring said digital values to said solid state memory; and
said inclinometer is remotely controlled by a central controller to make measurements, store said digital values and transmit said values to said central controller.

22. A method of utilizing the inclinometer of claim 18 or 19 comprising steps of:
placing said inclinometer in a desired location;, supplying power to said circuit;
converting signals from said sensor cell to frequency values;
transmitting said frequency values from a first of said two pairs of electrodes to said microprocessor;
counting and comparing said transmitted frequencies to arrive at a digital value corresponding to inclination in a first axis;

transmitting said frequency values from a second of said two pairs of electrodes to said microprocessor;

counting and comparing said transmitted frequencies to arrive at a digital value corresponding to inclination in a second axis;

transmitting said digital values to a solid state external memory; and polling said digital values in said solid state memory from a central controller by identifying said inclinometer according to a unique logical address stored in said solid state memory or in said microprocessor.

23. The method of claim 22, further comprising repeating each said counting and comparing step at least three times anti generating an average value corresponding to inclination in each of said first and second axes.

24. The method of claim 22, wherein said power is supplied by a non-stabilized power supply of 6–15 Volts.

25. The method of claim 22, wherein said circuit further comprises a temperature gauge and measuring the temperature using said gauge during each of said transmitting of said frequency values, transmitting temperature data to said microprocessor, and using a calibration file in said microprocessor to modify said inclination values according to said temperature.

26. The method of claim 22, further comprising using drift circuit means in said circuit to compensate for effects from temperature changes on said signals from said sensor cell.

27. The method of claim 22, further comprising using an individual calibration file located in said central controller or in said microprocessor to adjust said digital values according to structural features specific to said sensor cell.

28. The method of claim 22, further comprising using said central controller to turn on said inclinometer and to request measurements in real time.

29. The method of claim 22, further comprising programming said microprocessor to take measurements at predetermined intervals and store resulting said digital values in said solid state memory.

30. An inclinometer network including at least two inclinometers according to any one of claims 18 or 19, wherein each of said two inclinometers has a serial interface linking each of said two inclinometers to said network;

a central controller for programming, polling and receiving data from said inclinometers according to a unique address associated with each of said two inclinometers;

means for connecting said inclinometers together in logical chains;

a power source and a master device in communication with each of said central controller and said power source; and said master device being capable of turning power to said inclinometers on and off according to commands from said central controller.

31. The network of claim 30, further comprising autonomous mode means for operating said network, wherein said master device periodically activates said network according to a preset program and said inclinometers take measurements and store data; said inclinometers transmitting compiled data upon request from said central controller.

32. The network of claim 30, wherein said power source comprises a non-stabilized 6–15 Volt source.

33. The network of claim 30, wherein said central controller includes software means for processing and presenting said data in a graphical format.

* * * * *